(12) United States Patent
Ladd

(10) Patent No.: X9165
(45) Date of Patent: Oct. 14, 1835

(54) FIRE-ARMS, OVERLAYING WITH TIN, &C.

(76) Inventor: Samuel Ladd

Samuel Ladd of Waltham Massachusetts
Letters Patent,

The schedule referred to in these Letters Patent and making a part of the same containing a description of the words of the said Samuel Ladd himself of his improvement in overlaying fire arms with Tin or some compound of a similar nature To all to whom these presents shall come — Be it known That I, Saml. Ladd of Waltham in the County of Middlesex and State of Massachusetts have inventor a new and useful improvement in overlaying fire arms with Tin or some compound Metal of a similar nature and the the following is a full and exact description thereof to wit The above named improvement consists in coating over the barrel out side and inside, also the lock, ramrod, bayonet and all the metalic part of fire arms with tin or some compound metal thereby to prevent the same from corroding with rust, also in firing the piece there is greater force imparted to the charge;

What I claim as my invention and not previously known in the above named improvement is the application of tin or some compound Metal of a similar nature to fire arms

Samuel Ladd.

Witness
David Townsend
Arad Moore
James McVay

[illegible]